US 8,049,159 B2

(12) United States Patent
Shinoda

(10) Patent No.: US 8,049,159 B2
(45) Date of Patent: Nov. 1, 2011

(54) OPTICAL TRANSMITTER-RECEIVER SUBASSEMBLY AND OPTICAL TRANSMITTER-RECEIVER MODULE

(75) Inventor: Takuya Shinoda, Tokyo (JP)

(73) Assignee: NEC Corporation, Tokyo (JP)

( * ) Notice: Subject to any disclaimer, the term of this patent is extended or adjusted under 35 U.S.C. 154(b) by 698 days.

(21) Appl. No.: 12/182,452

(22) Filed: Jul. 30, 2008

(65) Prior Publication Data

US 2009/0034983 A1 Feb. 5, 2009

(30) Foreign Application Priority Data

Jul. 31, 2007 (JP) ................. 2007-198353

(51) Int. Cl.
*G02B 6/12* (2006.01)
*H04B 10/12* (2006.01)
*H04J 14/00* (2006.01)
(52) U.S. Cl. ............... 250/227.11; 385/14; 398/139; 398/164
(58) Field of Classification Search ............ 250/227.11; 398/139, 164; 385/14, 129, 130, 131, 132
See application file for complete search history.

(56) References Cited

U.S. PATENT DOCUMENTS

| 6,497,518 | B1 * | 12/2002 | Deane | 385/92 |
|---|---|---|---|---|
| 6,655,856 | B2 * | 12/2003 | Nakanishi et al. | 385/94 |
| 7,116,912 | B2 * | 10/2006 | Pang et al. | 398/139 |
| 7,184,669 | B2 * | 2/2007 | Gordon | 398/138 |
| 7,220,063 | B2 * | 5/2007 | Chung et al. | 385/88 |
| 7,281,864 | B2 * | 10/2007 | Mizue et al. | 385/92 |
| 7,396,166 | B1 * | 7/2008 | Chou | 385/92 |
| 7,490,993 | B2 * | 2/2009 | Pitwon | 385/53 |
| RE41,147 | E * | 2/2010 | Pang et al. | 398/139 |
| 2001/0024553 | A1 * | 9/2001 | Nakanishi et al. | 385/94 |
| 2003/0161588 | A1 * | 8/2003 | Wolf et al. | 385/88 |
| 2003/0161592 | A1 * | 8/2003 | Wolf et al. | 385/92 |
| 2003/0161593 | A1 * | 8/2003 | Stackhouse | 385/92 |
| 2004/0126117 | A1 * | 7/2004 | Lo et al. | 398/139 |
| 2004/0126118 | A1 * | 7/2004 | Lo et al. | 398/139 |
| 2004/0240803 | A1 * | 12/2004 | Rechberger et al. | 385/93 |
| 2005/0047795 | A1 * | 3/2005 | Windover et al. | 398/164 |
| 2007/0258715 | A1 * | 11/2007 | Androni et al. | 398/79 |
| 2008/0124089 | A1 * | 5/2008 | Ishigami et al. | 398/139 |
| 2008/0193141 | A1 * | 8/2008 | Shinoda | 398/139 |
| 2008/0205885 | A1 * | 8/2008 | Watte et al. | 398/25 |
| 2008/0285978 | A1 * | 11/2008 | Choi et al. | 398/139 |
| 2008/0310854 | A1 * | 12/2008 | Takai et al. | 398/139 |
| 2009/0034983 | A1 * | 2/2009 | Shinoda | 398/141 |
| 2010/0008675 | A1 * | 1/2010 | De Dobbelaere | 398/135 |
| 2010/0046955 | A1 * | 2/2010 | De Dobbelaere et al. | 398/139 |

FOREIGN PATENT DOCUMENTS

JP 11-68705 3/1993
JP 2007-28539 2/2007

\* cited by examiner

*Primary Examiner* — John Lee
(74) *Attorney, Agent, or Firm* — Young & Thompson

(57) ABSTRACT

An optical transmitter-receiver subassembly including a light-emitting element which converts a current into an output optical signal, a light-receiving element which converts an input optical signal from an optical fiber into a current, a planar lightwave circuit which guides the output optical signal and the input optical signal, and comprises the light-emitting element and the light-receiving element, a first land pad through which the current to be input to the light-emitting element passes, a second land pad through which the current output from the light-receiving element passes, a package which is electrically coupled to the planar lightwave circuit and includes the first land pad and the second land pad.

8 Claims, 5 Drawing Sheets

OPTICAL TRANSMITTER-RECEIVER SUBASSEMBLY AND OPTICAL TRANSMITTER-RECEIVER MODULE

This application is based upon and claims the benefit of priority from Japanese patent application No. 2007-198353, filed on Jul. 31, 2007, the disclosure of which is incorporated herein in its entirety by reference.

BACKGROUND OF THE INVENTION

1. Field of the Invention

The present invention relates to downsizing of an optical transmitter-receiver module.

2. Description of the Related Art

In recent years, application domains of optical communications rapidly shift from a trunk transmission system to a subscriber loop system. For this reason, the downsizing and cost reduction of an optical transmitter-receiver module used for an optical subscriber loop system is important. Responding to this object, an application of the optical transmitter-receiver module, which uses a waveguide to integrate a transmission function and a reception function, is entering into a mainstream. In this context, the optical transmitter-receiver module, onto which an optical transmitter-received subassembly is provided, has been developed. For example, Japanese Patent Application Laid-open No. Hei 11-68705 discloses a wavelength division multiplexing (WDM) optical transmitter-receiver module. Japanese Patent Application Laid-open No. 2007-28539 also discloses an optical transmitter-receiver module which more simply duplexes a single-core two-way optical transmission system.

FIG. 5 shows an example of an optical transmitter-receiver subassembly 90 onto which leads are provided. The optical transmitter-receiver subassembly 90 includes a planar lightwave circuit (planar lightwave optical circuit) 92 and a transimpedance amplifier integrated circuit (IC) 22 provided onto a ceramic package 91. A flange 96 fixes an optical fiber 95 Leads (terminals) 93 are provided onto the ceramic package 91 to input/output a current between the planar lightwave circuit 92 and the exterior. The leads 93 are soldered onto a printed circuit board (printed-wiring board) to electrically connect the optical transmitter-receiver subassembly 90 to the printed circuit board. For illustrative purposes, FIG. 5 visibly shows the state where the planar lightwave circuit 92 and the like are provided.

However, the optical transmitter-receiver subassembly is manually mounted onto the printed circuit board through the leads. Therefore, the printed circuit board requires an area for soldering the leads onto it. Moreover, a Multi Source Agreement (MSA) defines the size of the optical transmitter-receiver module. The MSA allows a product package size, pin arrangements, and specifications to be shared by a plurality of vendors to establish a stable product supply system. Therefore, the size of the single optical transmitter-receiver module limits the number of optical transmitter-receiver modules incorporated into a communication device. As a result, it is difficult to increase the number of channels.

Moreover, with the increase in the use of the optical subscriber loop systems, an optical communication device is desired to be reduced in size. Therefore, it is necessary to reduce the size of the optical transmitter-receiver module and to provide the optical transmitter-receiver module at a higher density.

SUMMARY OF THE INVENTION

The present invention is devised in view of the above-described circumstances and has an object of downsizing an optical transmitter-receiver module.

An exemplary object of the invention is to enable the downsizing of the optical transmitter-receiver module and the providing of the optical transmitter-receiver module at a higher density.

An exemplary aspect of the invention includes an optical transmitter-receiver subassembly including: a light-emitting element which converts a current into an output optical signal; a light-receiving element which converts an input optical signal from an optical fiber into a current; a planar lightwave circuit which guides the output optical signal and the input optical signal, and includes the light-emitting element and the light-receiving element; a first land pad through which the current to be input to the light-emitting element passes; a second land pad through which the current output from the light-receiving element passes; a package which is electrically coupled to the planar lightwave circuit and includes the first land pad and the second land pad.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE EXEMPLARY EMBODIMENTS

Figure 1:
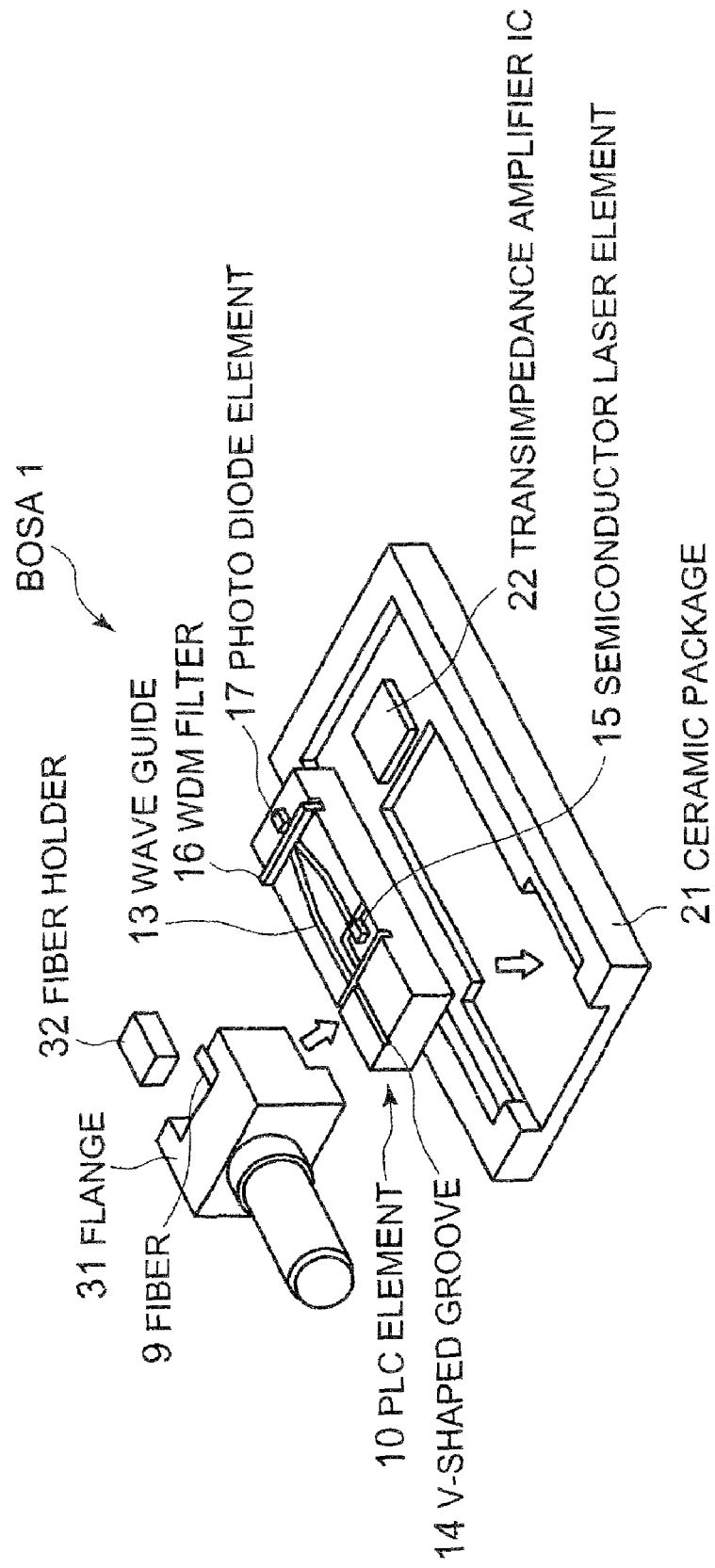
FIG. 1 is a diagram illustrating an example of an optical transmitter-receiver subassembly in a first embodiment of the present invention.

Hereinafter, exemplary embodiments of the present invention will be described referring to the accompanying drawings. For clarification of the description, the following description and drawings are omitted and simplified as needed. In each of the drawings, the components having the same configuration or function and the equivalents thereof are denoted by the same reference numerals, and the description thereof is herein omitted.

The following embodiments describe an exemplary embodiment for constituting an optical transmitter-receiver subassembly to have a leadless structure. In this manner, a printed circuit board is downsized to reduce an area necessary for providing the optical transmitter-receiver subassembly onto the printed circuit board. Hereinafter, a configuration of an exemplary embodiment in the embodiments of the present invention will be described.

First Embodiment

FIG. 1 shows an example of an optical transmitter-receiver subassembly onto which a planar lightwave circuit (hereinafter, abbreviated as PLC) is provided. An optical transmitter-receiver subassembly (bi-directional optical subassembly: BOSA) 1 includes a PLC element 10, a ceramic package (also referred to simply as the package) 21, and a flange 31. The PLC element 10 includes a waveguide 13 folded into an approximate V-like shape on a quartz film deposited on a substrate. Further, a tip of an end of the waveguide 13 forms a fiber providing/fixing V-shaped groove (also referred to simply as the V-shaped groove) 14. A fiber (optical fiber) 9 is provided into the V-shaped groove 14.

On the substrate, a tip of the other end of the waveguide 13 includes a semiconductor laser element 15. Moreover, the PLC element 10 includes a wavelength division multiplexing (WDM) filter 16 at the folded portion of the waveguide 13. A photodiode element 17 is provided behind (to be opposed to) the WDM filter 16. The semiconductor laser element 15 is also called an LD (laser diode) element or a light-emitting element. The semiconductor laser element 15 receives a current obtained by the conversion of a propagating electric signal and converts the received current into an optical signal. The semiconductor laser element 15 output the optical signal obtained by the conversion to a propagation path through the fiber 9. The photodiode element 17 is also called a PD element or a light-receiving element. The photodiode element 17 receives the optical signal from the fiber 9 and converts the received optical signal into a current. The current obtained by the conversion is converted into an electric signal to be processed in a subsequent step.

The ceramic package 21 includes a transimpedance amplifier IC 22. The fiber 9 and the flange 31 are provided along the fiber providing/fixing V-shaped groove 14 onto the PLC element 10. A fiber holder 32 is provided to fix the fiber 9.

Figure 2:
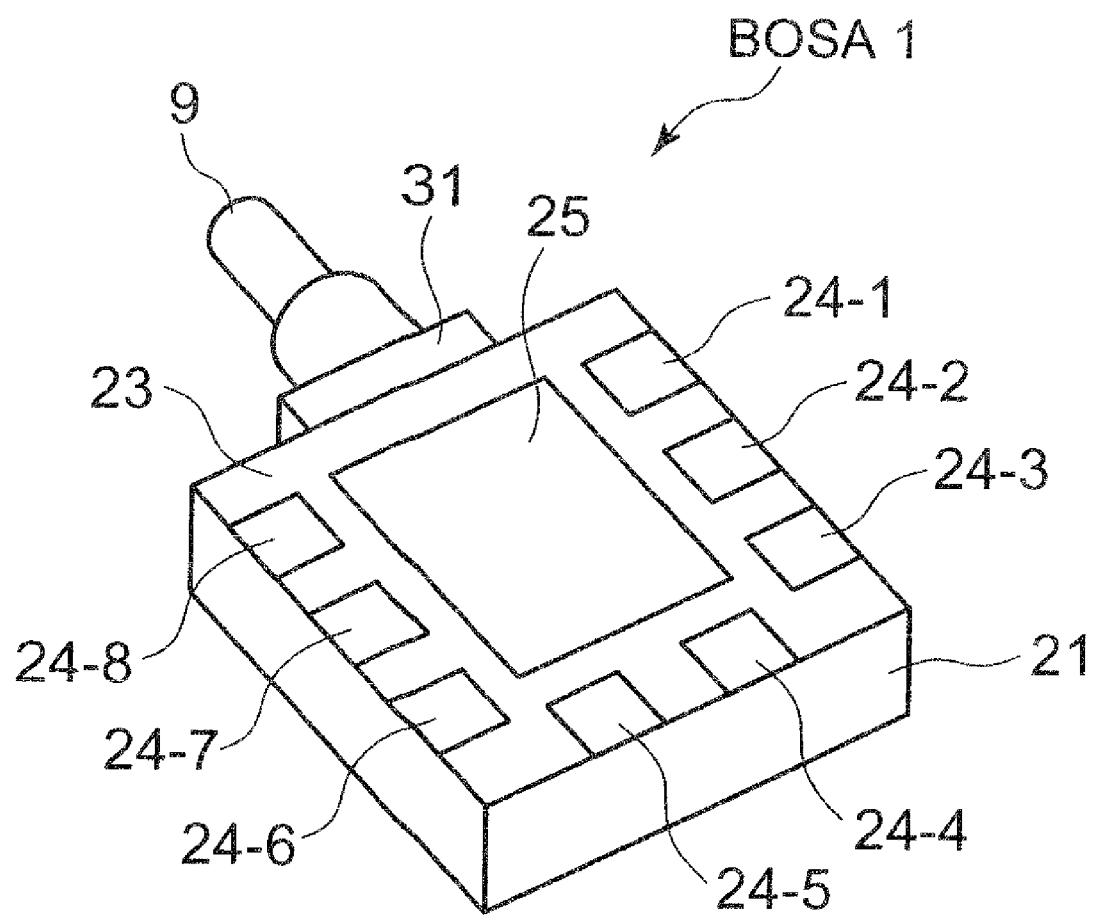
FIG. 2 is a diagram illustrating a state where a BOSA illustrated in FIG. 1 is packaged.

FIG. 2 is a diagram illustrating an example of a state where the BOSA 1 illustrated in FIG. 1 is packaged. The upper surface of the packaged BOSA 1 illustrated in FIG. 2 is shows the lower surface of the BOSA 1 illustrated in FIG. 1. An upper surface 23 of the ceramic package 21 includes a plurality of land pads 24-1 to 24-8 and a grand pad (GND pad) 25. Throughout this specification, when the land pad is denoted simply by the reference numeral 24 as "the land pad 24", the land pad 24 is one of the plurality of land pads or the plurality of land pads. Eight land pads 24 are provided as an example of FIG. 2, but the number of land pads is not limited thereto. Moreover, the plurality of land pads 24 includes a first land pad for inputting a current to be input from the exterior to the semiconductor laser element 15 and a second land pad for outputting a current from the photodiode element 17 to the exterior. The land pad 24 and the grand pad 25, and the PLC element 10 are electrically connected to each other by, for example, a bonding wire.

Figure 5:
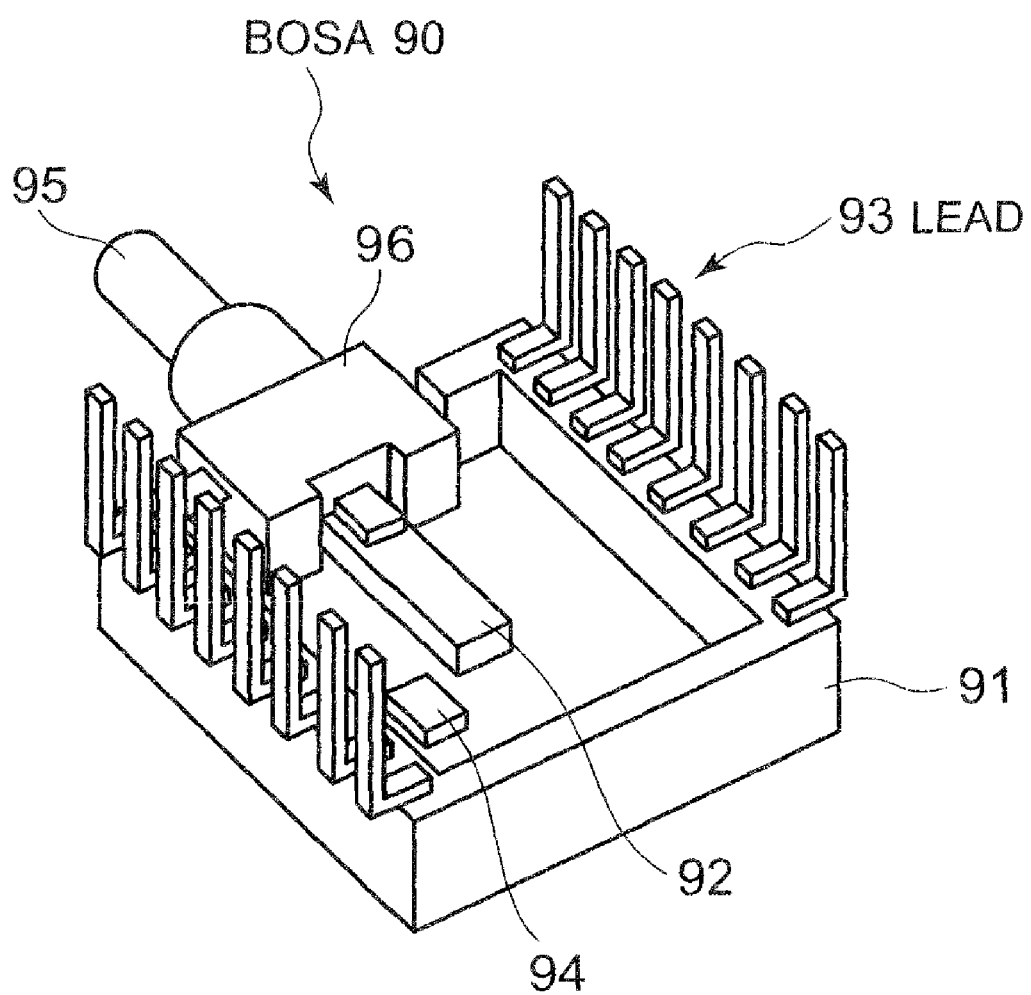
FIG. 5 is a diagram illustrating an example of the optical transmitter-receiver subassembly related to the present invention.

In the BOSA 1, the size of the ceramic package 21 is determined based on the size of the PLC element 10 and the area of the land pads 24. The downsizing of the ceramic package 21 can downsize the optical transmitter-receiver subassembly. Moreover, the ceramic package 21 of the BOSA 1 illustrated in FIG. 2 can be reduced in size as compared with the ceramic package 91 illustrated in FIG. 5. The ceramic package 91 requires a region for providing the leads 93 in the periphery and is preferred to have a larger area as compared with an area of the land pads 24. Therefore, the ceramic package 91 is larger than the ceramic package 21. Moreover, in order to reduce the area for providing the leads 93, a technique for thinning the leads 93 has also been developed. However, there is a limit in thinning the leads 93 in view of strength or the like. For this reason, there is a limit in the reduction of the ceramic package 91 in size.

Further, as compared with the BOSA 1 which is a structure using the leads, the BOSA 1 which is a leadless structure has improved heat radiation effects from the grand pad 25 of the BOSA 1. Specifically, when the leads are used for the BOSA 1, a point corresponding to each lead radiates heat. On the other hand, when the BOSA 1 has a leadless structure, each of the land pads 24 and the grand pad 25 to be electrically connected constitutes a plane. Therefore, a heat radiation area increases. The grand pad 25 serves to radiate the heat generated from the PLC element 10 to the exterior. In particular, since an element provided onto the BOSA 1 is heat-sensitive, it is necessary to improve the heat radiation effects. The amount of radiated heat increases as the area of the grand pad 25 increases. Therefore, the heat radiation effects are expected to be improved as the area of the grand pad 25 becomes larger. For example, it is preferred to reserve an area for the grand pad 25, which is larger at least than the single land pad 24.

Moreover, the location of the grand pad 25 is in the center of the ceramic package 21 in FIG. 2, but it is not limited thereto. The grand pad 25 may be provided in a peripheral area of the ceramic package 21. The location of the grand pad 25 is determined in consideration of those of the land pads 24.

Figure 3:
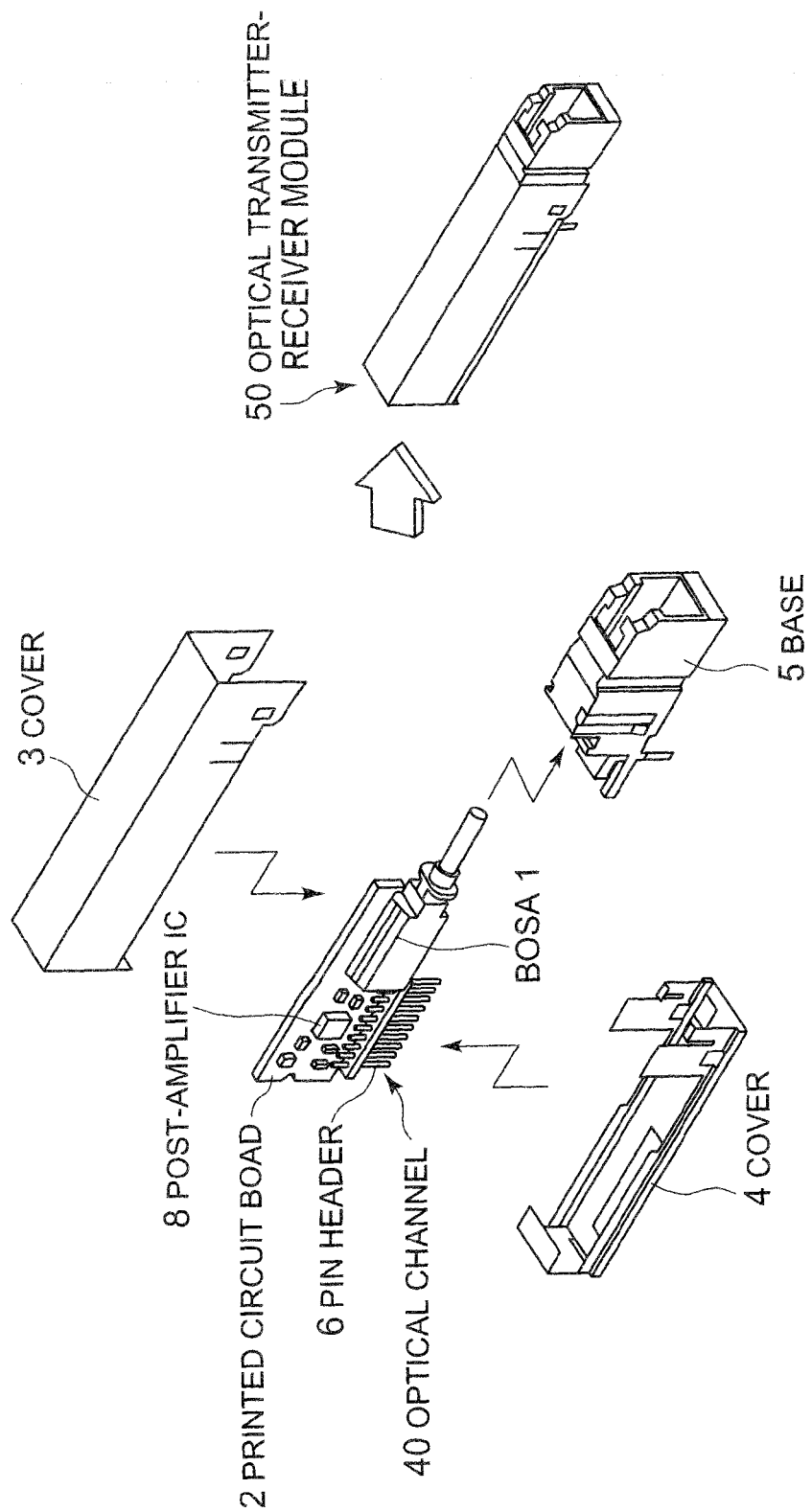
FIG. 3 is a diagram illustrating an example of an optical transmitter-receiver module in which the optical transmitter-receiver subassembly illustrated in FIGS. 1 and 2 is provided.

FIG. 3 is a view illustrating an example of an optical transmitter-receiver module in which the BOSA 1 illustrated in FIGS. 1 and 2 is provided. The BOSA 1, a pin header 6, a post-amplifier IC 8, and chip components are mounted onto a printed circuit board 2 by reflow surface-mounting. Although not illustrated in FIG. 3, an LD driver IC is provided onto a bottom face of the printed circuit board 2 at a position close to the BOSA 1. In the following description, the printed circuit board 2, onto which the BOSA 1, the pin header 6, the LD driver IC, the post-amplifier IC 8, and the chip components are provided, is referred to as an "optical channel".

An optical transmitter-receiver module 50 includes an optical channel 40, covers 3 and 4, and a base (casing) 5. The left side of FIG. 3 shows the optical channel 40, the covers 3 and 4, and the base 5 in an expanded manner. The right side of FIG. 3 shows the optical channel 40, the covers 3 and 4, and the base 5 assembled into the optical transmitter-receiver module 50.

The size of each of the covers 3 and 4 and the base 5 is reduced while maintaining the strength large enough to protect the optical channel 40. In this manner, the optical transmitter-receiver module 50 can be downsized.

The optical channel 40 is pressed into the base 5 in an upright position to maintain the optical standard. The optical channel 40 is interposed between the cases 3 and 4 in a vertical direction to constitute the optical transmitter-receiver module 50. The optical channel 40 is arranged upright to save a space in a horizontal direction (space in a width direction and a bottom area). In other words, the optical channel 40 is provided to make a surface of the printed circuit board 2, onto which the BOSA 1 is provided, vertical to the bottom face. Specifically, the BOSA 1 is provided onto a side surface of the printed circuit board 2. As a result, a width can be reduced. The width is reduced because a smaller width is desirable when the optical transmitter-receiver module 50 is to be installed. When a plurality of the optical transmitter-receiver modules 50 is to be provided, the reduction of the width is particularly demanded. Since the BOSA 1 is a leadless structure to reduce the size in this embodiment, the printed circuit board can be downsized. Therefore, a space in a vertical direction can also be saved.

Further, owing to the leadless structure of the BOSA 1, the BOSA 1 can be mounted onto the printed circuit board 2 by reflow surface-mounting. Therefore, the BOSA 1 can be provided in the same manufacturing step as that for mounting the other surface-mounted components (for example, post-amplifier IC 8) onto the printed circuit board 2. As a result, the amount of operation for a fabrication step for electrically connecting the BOSA 1 to the printed circuit board can be reduced.

FIGS. 1 to 3 show an operation of the optical transmitter-receiver module according to this first embodiment In FIG. 3, the pin header 6 inputs an electric signal. The LD driver IC converts the electric signal input by the pin header 6 into a current. The current obtained by the conversion passes through the ceramic package 21 through the land pad 24 (first land pad) to be input to the semiconductor laser element 15. The semiconductor laser element 15 converts the input current into light and then outputs the signal light (optical signal) obtained by the conversion to the waveguide 13. The thus output signal light is coupled to the waveguide 13 to propagate through the waveguide 13. The WDM filter 16 totally reflects the propagating signal light. The reflected propagating signal light passes from the waveguide 13 through the fiber 9 to propagate to a transmission path. After passing through the fiber 9, the signal light from the transmission path propagates through the waveguide 13. Thereafter, the signal light is transmitted through the WDM filter 16. And the photodiode element 17 for receiving the signal receives the signal light. The photodiode element 17 converts the received signal light into a current. The transimpedance amplifier IC 22 converts the current obtained by the conversion into an amplified electric signal. The electric signal passes through the ceramic package 21 through the land pad 24 (second land pad) to be output to the exterior of the BOSA 1. The post-amplifier IC 8 further amplifies the electric signal output from the land pad 24. And the post-amplifier IC 8 output the amplified electric signal to the exterior through the pin header 6.

As described above, according to this first embodiment, the optical transmitter-receiver subassembly using the PLC is constituted to have a leadless structure. As a result, the optical channel can be downsized. Moreover, the optical channel is arranged upright to save the space in the width direction (space in the horizontal direction), thereby downsizing the optical transmitter-receiver subassembly. Further, the optical transmitter-receiver subassembly is constituted to have a leadless structure, the optical transmitter-receiver subassembly and the other ICs can be, mounted onto the printed circuit board by the reflow surface-mounting at a time. As a result, the optical transmitter-receiver can be assembled more easily. Further, the grand pad of the optical transmitter-receiver subassembly is surface-mounded to be opposed to the printed circuit board. Therefore, the heat generated in the optical transmitter-receiver subassembly is more likely to propagate to the printed circuit board to improve the heat radiation performance of the optical transmitter-receiver subassembly.

Second Embodiment

In a second embodiment describes the case where a single optical transmitter-receiver module comprises a plurality of optical channels. In a conventional array optical module having multiple channels, when the failure of one arbitrary optical channel occurs, even the other normally operating channels have to be sacrificed. Specifically, if the failure of one optical channel occurs in the case where each optical channel is not independent, even the other provided optical channels cannot be used. For example, such a problem occurs when the optical channel has an integrated structure as in the case where a plurality of BOSAs is provided onto a single printed circuit board. A similar problem also occurs when control methods are associated with each other between a plurality of optical channels. For example, the problem occurs in the case where a single LD driver IC controls a plurality of BOSAs.

Therefore, in this second embodiment, an optical transmitter-receiver module comprising various numbers of channels can be realized. Further, in this second embodiment, an optical transmitter-receiver module capable of easily connecting and removing each optical transmitter-receiver module independently is provided. As a result, even if the failure of one arbitrary optical channel occurs, only the faulty channel can be replaced.

Figure 4:
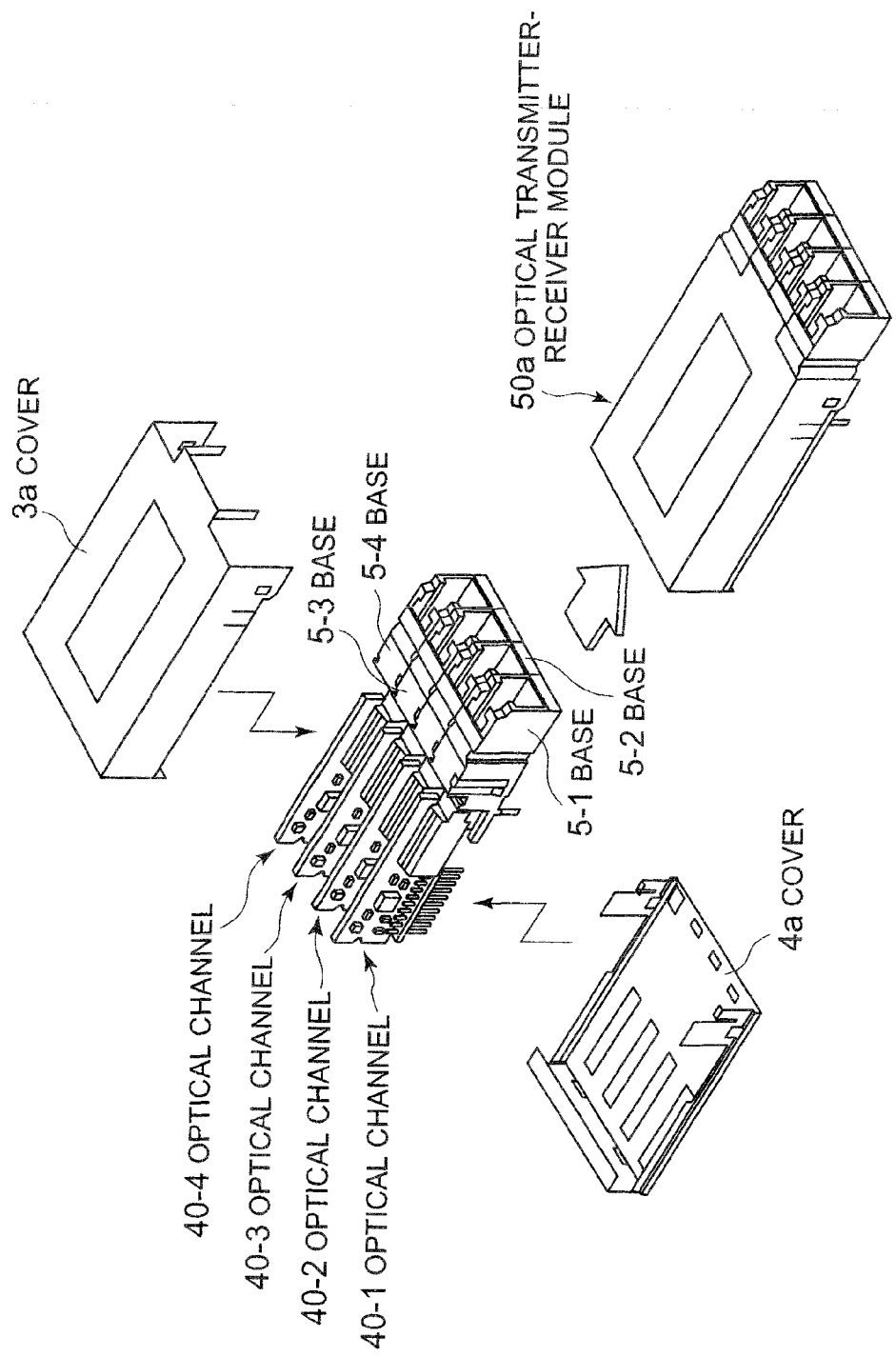
FIG. 4 is a diagram illustrating an example of the optical transmitter-receiver module according to a second embodiment of the present invention.

FIG. 4 shows an example of the optical transmitter-receiver module including four optical channels which are connected to each other to provide a four-channel function. An optical transmitter-receiver module 50a includes four optical channels 40-1 to 40-4, four bases 5-1 to 5-4, and covers 3a and 4a. The four optical channels 40-1 to 40-4 are respectively pressed into the bases 5-1 to 5-4. Each of the covers 3a and 4a has the size large enough to cover the four optical channels 40-1 to 40-4. When the plurality of optical channels 40-1 to 40-4 is to be provided, each of the optical channels can be arranged upright to be stacked. More specifically, the optical channels are provided to make a surface of the printed circuit board, onto which the PLC element 10 is provided, vertical to the bottom face of the printed circuit board. In this manner, the plurality of optical channels 40-1 to 40-4 is stacked. Since the optical channels are arranged upright to be stacked, the space for providing the optical transmitter-receiver module 50a can be saved. In particular, a width in which the fibers 9 are arranged can be reduced.

Moreover, since the BOSA 1 is leadless structure, the heat radiation effects from the grand pad 25 can be improved. As a result, even when the plurality of optical channels 40 is arranged in a row, the heat radiation from the grand pad 25 can restrains the occurrence of trouble by heat in the element provided onto the BOSA 1. Further, in this second embodiment, each combination of the optical channel and the base independently operates. Therefore, even when the failure of one of the optical channels occurs, the other optical channels operate normally. By repairing and replacing the faulty optical channel, the four optical channels can be made to function normally.

FIG. 4 illustrates the case where four optical channels are provided, but the number of optical channels is not limited thereto. The optical transmitter-receiver module can comprises multiple channels since a plurality of combinations of an optical channel and a base is provided to the optical transmitter-receiver module. In this case, it suffices to fabricate the size of the cover portion according to the number of channels.

As described above, according to the exemplary embodiments of the present invention, the optical transmitter-receiver subassembly, onto which the PLC element is provided, is constituted to have a leadless structure. As a result, the optical transmitter-receiver subassembly itself can be reduced in size. Moreover, the leadless structure of the optical transmitter-receiver subassembly allows the connection of the optical transmitter-receiver subassembly to the printed circuit board by the reflow surface-mounting. As a result, the size of the optical transmitter-receiver module can be reduced. Further, by housing the printed circuit board upright within the case, the area of the bottom face is reduced to realize the downsizing of the optical transmitter-receiver module.

Further, the downsizing of the optical transmitter-receiver module allows a plurality of the optical transmitter-receiver modules to connect each other. Therefore, an arbitrary number of channels can easily be combined. Therefore, the providing of a plurality of optical transmitter-receiver modules at a high density is realized.

Moreover, the leadless structure of the optical transmitter-receiver module enables the optical transmitter-receiver subassembly to be provided onto the surface of the printed circuit board without soldering leads. As a result, the optical transmitter-receiver subassembly can be provided to the printed circuit board easily. As a result, a fabrication step of the optical transmitter-receiver subassembly is expected to be streamlined.

In each of the above-described embodiments, the configuration of the PLC element 10 illustrated in FIG. 1 is only an example, and is not limited thereto. The other configurations may be used as long as the PLC element transmits and receives the optical signal.

While this invention has been described in connection with certain exemplary embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

Further, it is the inventor's intent to retain all equivalents of the claimed invention even if the claims are amended during prosecution.

What is claimed is:

1. An optical transmitter-receiver subassembly comprising:
   a light-emitting element which converts a current into an output optical signal;
   a light-receiving element which converts an input optical signal from an optical fiber into a current;
   a planar lightwave circuit which guides the output optical signal and the input optical signal, and comprises the light-emitting element and the light-receiving element;
   a first land pad through which the current to be input to the light-emitting element passes;
   a second land pad through which the current output from the light-receiving element passes;
   a package which is electrically coupled to the planar lightwave circuit, said first land pad and said second land pad being on an external surface of said package; and
   a thermally conductive grand pad on the external surface of said package and electrically connected to said planar lightwave circuit, the grand pad radiating heat from the planar lightwave circuit to an exterior.

2. An optical transmitter-receiver subassembly according to claim 1, wherein the grand pad is larger than each of the first land pad and the second land pad.

3. An optical transmitter-receiver module comprising:
   the optical transmitter-receiver subassembly according to claim 1;
   an electronic circuit which processes a current;
   a printed circuit board which is electrically coupled to the optical transmitter-receiver subassembly and includes the electronic circuit;
   a base on which the optical transmitter-receiver subassembly and the printed circuit board are provided; and
   a cover portion which covers the optical transmitter-receiver subassembly and the printed circuit board.

4. An optical transmitter-receiver module according to claim 3, wherein the grand pad contact with a surface of the printed circuit board.

5. An optical transmitter-receiver module according to claim 3, wherein the optical transmitter-receiver subassembly is provided on a side surface of the printed circuit board.

6. An optical transmitter-receiver module according to claim 3, further comprising a plurality of said base, wherein the cover portion covers the optical transmitter-receiver subassembly and the printed circuit board of each said base.

7. An optical transmitter-receiver module according to claim 3, wherein the optical transmitter-receiver subassembly is surface-mounted on the printed circuit board.

8. An optical transmitter-receiver module according to claim 3, wherein the optical transmitter-receiver subassembly is provided on the printed circuit board in a same manufacturing step as that for providing the electronic circuit.

* * * * *